(12) United States Patent
Goodge et al.

(10) Patent No.: US 8,413,309 B2
(45) Date of Patent: Apr. 9, 2013

(54) FLUID FILTRATION SYSTEM

(75) Inventors: Kevin Goodge, Chardon, OH (US);
John Larmon, Baltimore, MD (US)

(73) Assignee: Enceladus Water Group, Irvine, CA (US)

( * ) Notice: Subject to any disclaimer, the term of this patent is extended or adjusted under 35 U.S.C. 154(b) by 359 days.

(21) Appl. No.: 12/569,207

(22) Filed: Sep. 29, 2009

(65) Prior Publication Data
US 2010/0078377 A1    Apr. 1, 2010

Related U.S. Application Data

(60) Provisional application No. 61/100,790, filed on Sep. 29, 2008.

(51) Int. Cl.
*B01D 25/00* (2006.01)

(52) U.S. Cl. ........ 29/428; 210/232; 210/236; 210/323.2

(58) Field of Classification Search .................. None
See application file for complete search history.

(56) References Cited

U.S. PATENT DOCUMENTS

| | | | | | |
|---|---|---|---|---|---|
| 1,983,142 | A | * | 12/1934 | Moriya | 99/306 |
| 4,187,179 | A | * | 2/1980 | Harms | 210/238 |
| 4,297,209 | A | * | 10/1981 | DeVisser et al. | 210/107 |
| 4,402,828 | A | * | 9/1983 | Edens | 210/323.2 |
| 5,028,323 | A | * | 7/1991 | Gould et al. | 210/232 |
| 5,279,732 | A | | 1/1994 | Edens | |
| 5,575,833 | A | * | 11/1996 | Griffin | 95/117 |
| 5,795,472 | A | * | 8/1998 | Nurse, Jr. | 210/232 |
| 5,944,990 | A | | 8/1999 | Edens | |
| 2010/0078377 | A1 | * | 4/2010 | Goodge et al. | 210/236 |

OTHER PUBLICATIONS

4FOS and 5FOS product information, Shelco Filters, ©2005.

* cited by examiner

*Primary Examiner* — Robert James Popovics
(74) *Attorney, Agent, or Firm* — Calfee, Halter & Griswold LLP

(57) ABSTRACT

A fluid filtration device includes a tubular external shell assembled with first and second end plates. A cartridge plate is secured to the shell between the first and second end plates, such that the first end plate and the cartridge plate define a filtration chamber, and the second end plate and the cartridge plate define an outlet chamber. The cartridge plate includes a plurality of apertures configured to receive a plurality of filter elements assembled thereto. An inlet port intersects the filtration chamber, and an outlet port intersects the outlet chamber. The cartridge plate is secured to the shell by a laterally split, outwardly resilient retaining band received in interlocking engagement with a corresponding inner circumferential groove in the shell, the inner circumferential groove being positioned adjacent to the cartridge plate, such that the installed retaining band prevents longitudinal movement of the cartridge plate toward the second end plate.

18 Claims, 5 Drawing Sheets

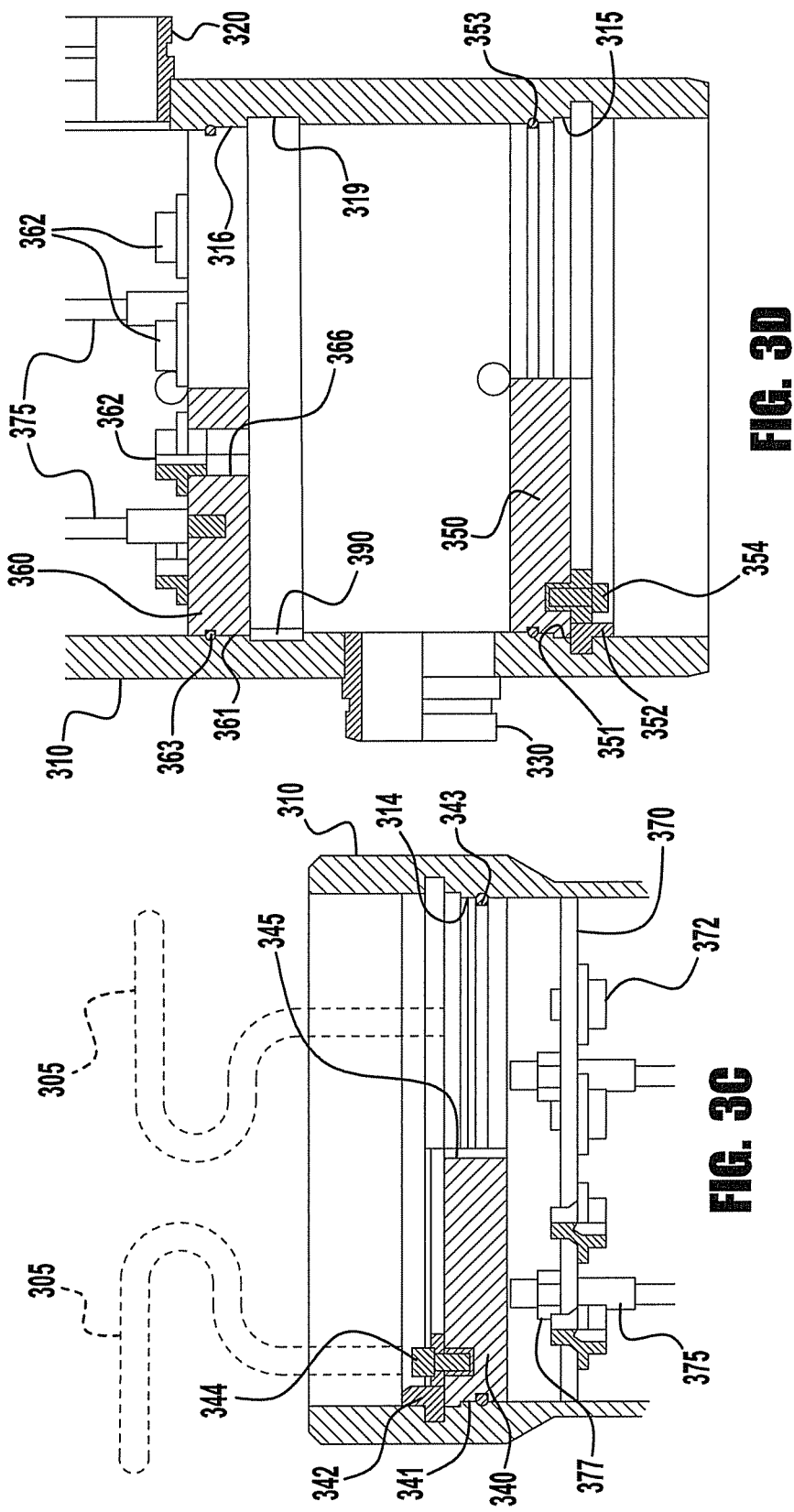

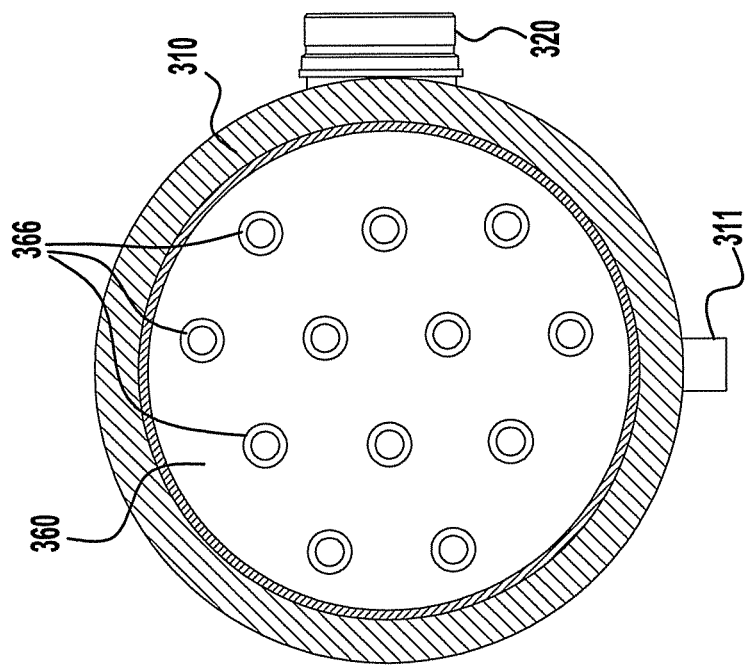
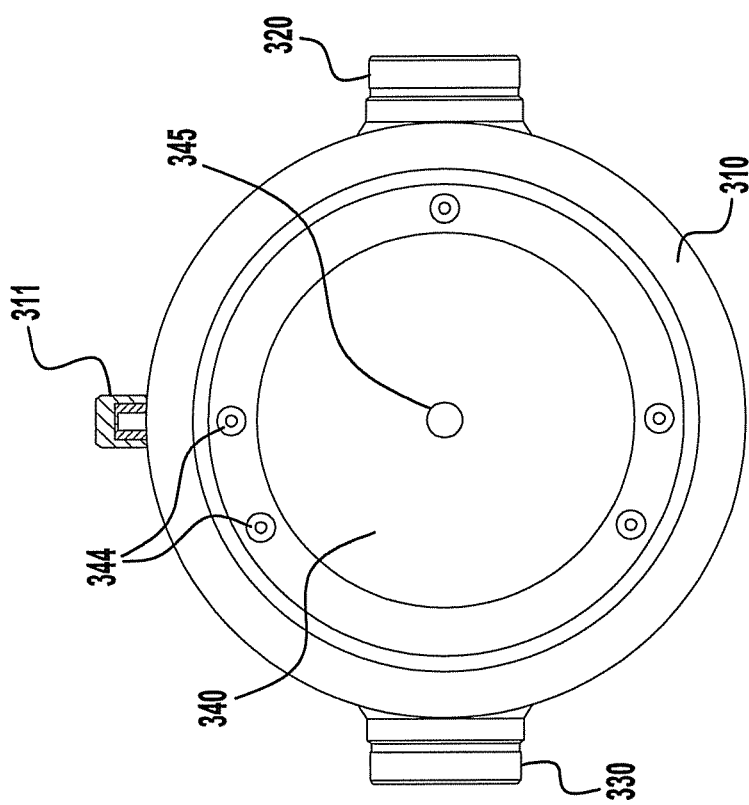

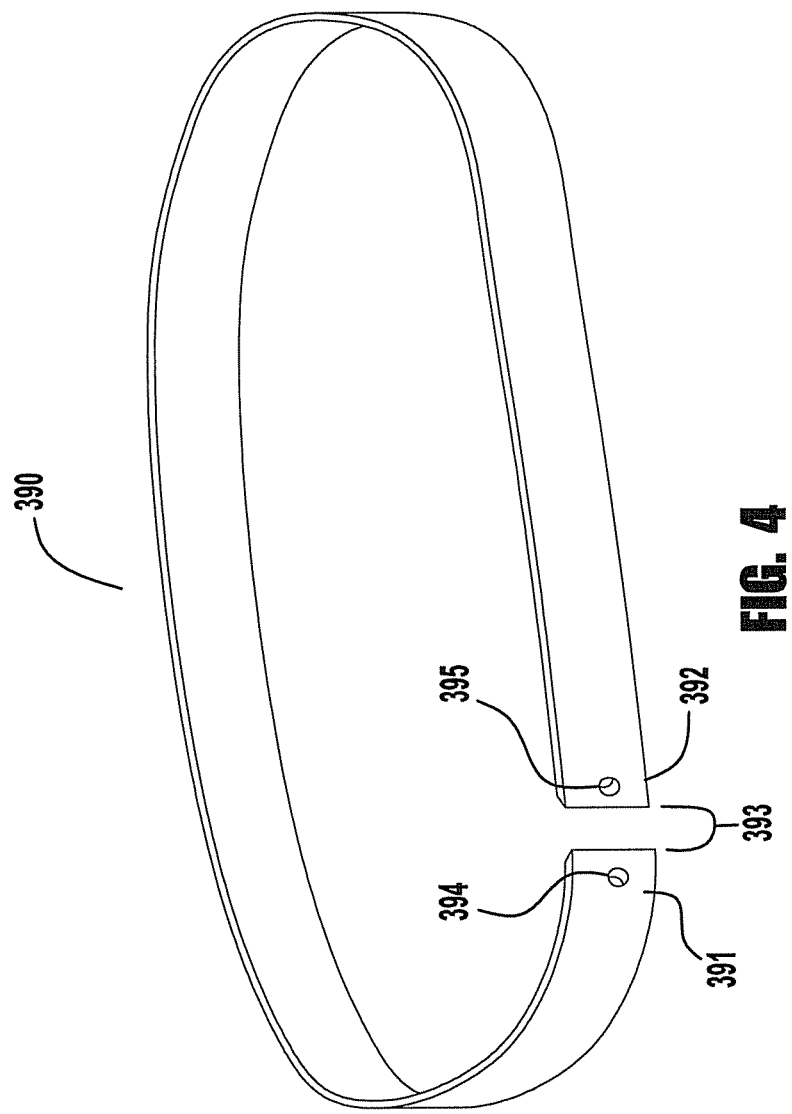

FLUID FILTRATION SYSTEM

CROSS-REFERENCE TO RELATED APPLICATION

This application claims the benefit of U.S. Provisional Patent Application Ser. No. 61/100,790, entitled FLUID FILTRATION SYSTEM and filed Sep. 29, 2008, the entire disclosure of which is incorporated herein by reference, to the extent that it is not conflicting with the present application.

BACKGROUND

Fluid filtration, including, for example, water filtration, often requires the filtering out of microscopic impurities while maintaining adequate fluid flow through the filtration system. In one embodiment, a filtration device includes a housing having an inlet port in communication with one or more filter elements or cartridges, and an outlet port in communication with outlet passages of the filter elements, such that pressurized fluid introduced to the inlet port is filtered of impurities as it passes through the filter elements, and is discharged from the outlet port in a filtered condition. A greater flow rate may be achieved by providing larger ports and/or by providing more filter elements.

SUMMARY

The present application contemplates fluid filtration devices adapted for improved performance, ease of maintenance, extended service life, of other such benefits.

In one inventive embodiment of the present application, a fluid filtration device includes a tubular external shell assembled with first and second end plates. A cartridge plate is secured to the shell between the first and second end plates, such that the first end plate and the cartridge plate define a filtration chamber, and the second end plate and the cartridge plate define an outlet chamber. The cartridge plate includes a plurality of apertures configured to receive a plurality of filter elements assembled thereto. An inlet port intersects the filtration chamber, and an outlet port intersects the outlet chamber. The cartridge plate is secured to the shell by a laterally split, outwardly resilient retaining band received in interlocking engagement with a corresponding inner circumferential groove in the shell, the inner circumferential groove being positioned adjacent to the cartridge plate, such that the installed retaining band prevents longitudinal movement of the cartridge plate toward the second end plate.

DESCRIPTION OF THE DRAWING

Features and advantages of the invention will become apparent from the following detailed description made with reference to the accompanying drawings, wherein:

FIG. 3C illustrates an enlarged partial side cross-sectional view of the fluid filtration device of FIG. 3A;

FIG. 3D illustrates another enlarged partial side cross-sectional view of the fluid filtration device of FIG. 3A;

FIG. 3E illustrates an end view of the fluid filtration device of FIG. 3A;

FIG. 3F illustrates an end cross-sectional view of the filtration device of FIG. 3A; and FIG. 4 illustrates a schematic perspective view of a retaining band for a cartridge plate of a fluid filtration device.

DETAILED DESCRIPTION

This Detailed Description of the Invention merely describes embodiments of the invention and is not intended to limit the scope of the claims in any way. Indeed, the invention as described in the claims is broader than and unlimited by the preferred embodiments, and the terms used in the claims have their full ordinary meaning.

Figure 2:
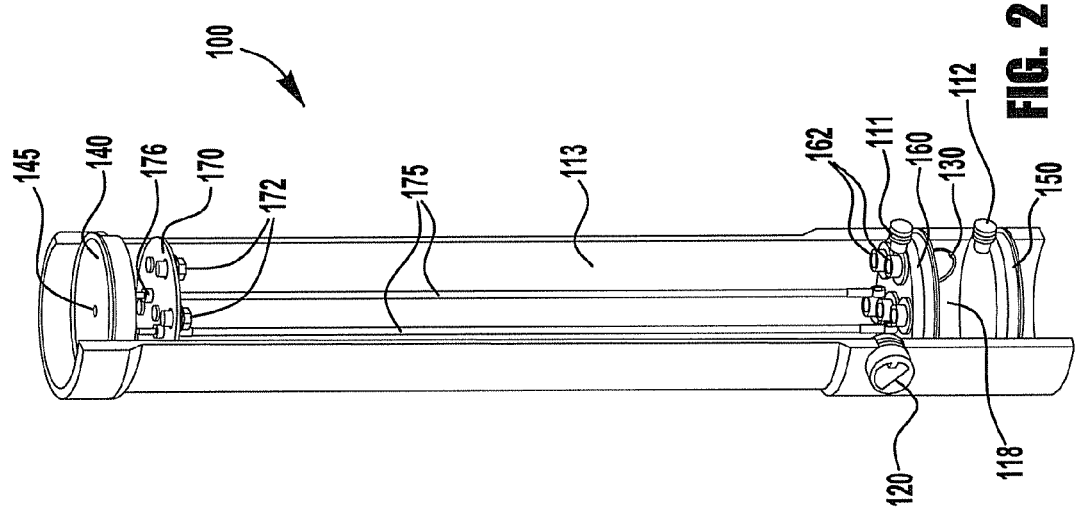
FIG. 2 illustrates a perspective view of the fluid filtration device of FIG. 1, with the housing shown in cross-section to illustrate additional features of the device.
Figure 1:
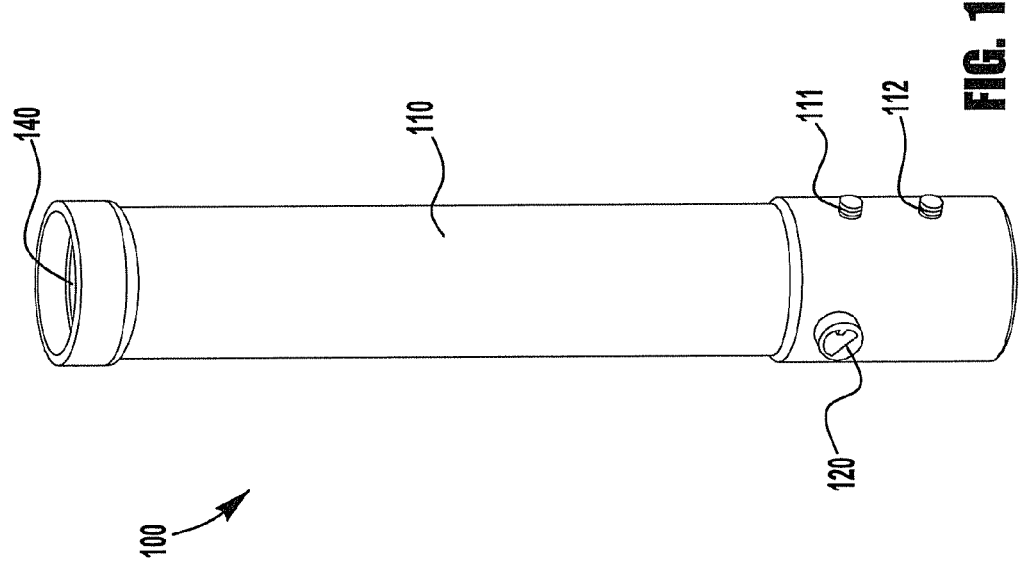
FIG. 1 illustrates a perspective view of a fluid filtration device.
Figures 3A, 3B:
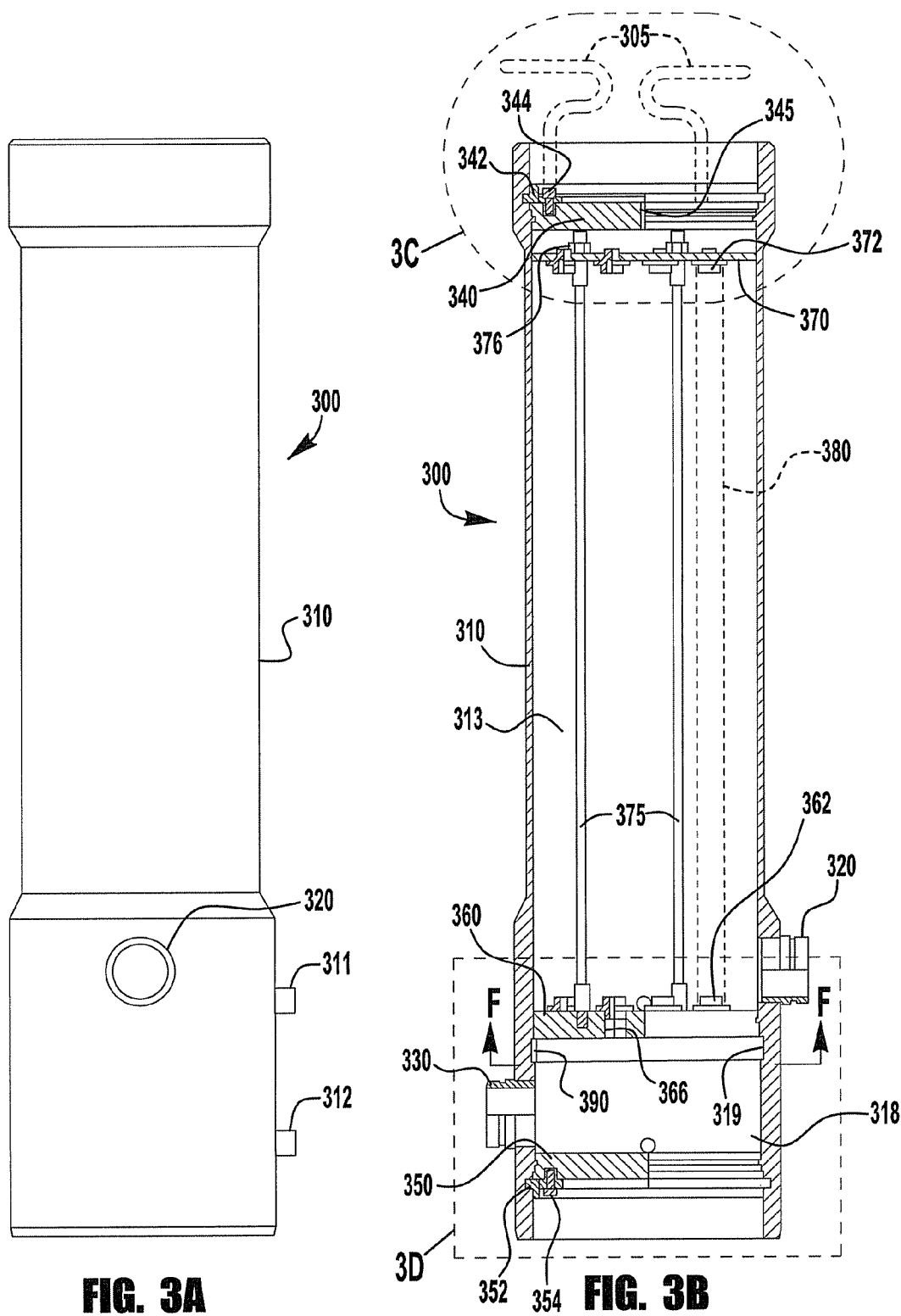
FIG. 3A illustrates a side view of a fluid filtration device.
FIG. 3B illustrates a side cross-sectional view of the fluid filtration device of FIG. 3A.

The present application is directed towards systems and methods for fluid filtration. In one embodiment, a fluid filtration device includes a housing configured to retain one or more filter elements, such that fluid entering an inlet port in the housing passes through the filter elements before being discharged through an outlet port in the housing. FIGS. 1 and 2 illustrate perspective views of an exemplary filtration housing 100 having an external shell 110, an inlet port 120, an outlet port 130, and upper and lower end plates 140, 150 that seal against the shell 110 (e.g., with o-ring seals) to provide a leak tight enclosure for a pressurized fluid (e.g., water) passing through the filtration system. The inlet and outlet ports 120, 130 are separated by an apertured cartridge plate 160 to define an upper filtration chamber 113 and a lower outlet chamber 118. The cartridge plate 160 includes end connections 162 (e.g., hollow rubber pads) aligned with each aperture for sealing with and supporting lower ends of tubular filter cartridges (not shown). Upper ends of the filter cartridges connect with and seal against corresponding end plugs 172 (e.g., rubber pads), which may be supported by a locating plate 170, which need not (but may) seal against the shell 110. Locating rods 175 may be assembled at opposite ends to the cartridge plate 160 and locating plate 170, to provide additional support and alignment for the filter cartridges. The locating rods 175 may be sized to allow for vertical adjustment of the locating plate 170 (e.g., by adjusting threaded nuts 176), for example, to accommodate filter cartridges of varying lengths.

When pressurized fluid is applied to the inlet port 120, the fluid passes through the porous sides of the filter elements provided with the filter cartridges (thereby filtering impurities from the fluid) and flows through the hollow central portions of the filter cartridges to pass through the end connections 162 and apertures in the cartridge plate 160, allowing the filtered fluid to be discharged from the outlet port 130. For ease of purging the filtration vessel, pluggable drain ports 111, 112 may be provided in the shell 110, for draining unfiltered fluid and contaminates from the filtration chamber 113, and filtered fluid from the outlet chamber 118. Additionally, a pluggable vent port 145 may be provided in the upper end plate 140, for example, to relieve excess pressure, or to measure internal pressure (e.g., with a pressure gauge).

Fluids being filtered often have corrosive effects on materials with which they come in contact (e.g., stainless steel and other metals). This corrosive effect may be aggravated by exposure to increased pressure, temperature fluctuations, or contaminants within the fluid. When filtration equipment is provided in materials susceptible to such corrosion, these corrosive effects may reduce service life of the filter elements or other filtration components, and may produce unfiltered contaminants downstream of the filter elements. According to an inventive aspect of the present application, one or more components of a filtration vessel may be provided in materials selected to improve corrosion resistance, service life, cost efficiency, overall weight, and/or chemical compatibility. In one embodiment, one or more of the filtration vessel components is provided in a polymer material or coated with a polymer material, such as, for example, fiberglass reinforced plastic (FRP), including spiral wound fiberglass roving and epoxy resin materials, polyvinyl chloride (PVC), glass filled polypropylene, and glass filled acrylonitrile-butadiene-styrene (ABS). In an exemplary embodiment, the shell 110 and locating plate 170 are provided in FRP, the end plates 140, 150 and cartridge plate 160 are provided in PVC, the drain ports are provided in ABS, and the end connections 162 and end plugs 172 are provided in nitrile rubber. While other components may be provided in metal (e.g., stainless steel), such as, for example, the locating rods 175, inlet and outlet ports 120, 130, and end plate and port retaining hardware, one or more of these components may also be provided in polymer materials (such as those listed above), for example, to improve chemical compatibility.

FIGS. 3A-3F illustrate various views of another exemplary fluid filtration device 300 adapted for corrosion resistance and ease of maintenance. The filtration device 300 includes an external shell 310, an inlet port 320, an outlet port 330, and upper and lower end plates 340, 350 that seal against the shell 310 to provide a leak tight enclosure for a pressurized fluid (e.g., water) passing through the filtration system. As shown, handles 305 may be secured, for example, to the upper end plate 340 to facilitate transportation of the device 300. The inlet and outlet ports 320, 330 are separated by an apertured cartridge plate 360 to define an upper filtration chamber 313 and a lower outlet chamber 318. The cartridge plate 360 includes end connections 362 (e.g., hollow rubber pads) aligned with each aperture for sealing with and supporting lower ends of tubular filter cartridges (shown schematically at 380 in FIG. 3B). Upper ends of the filter cartridges connect with and seal against corresponding end plugs 372 (e.g., rubber pads), which may be supported by a locating plate 370, which need not (but may) seal against the shell 310. Locating rods 375 may be assembled at opposite ends to the cartridge plate 360 and locating plate 370 (for example, by assembly with nuts 376), to provide additional support and alignment for the filter cartridges. The locating rods 375 may be sized to allow for vertical adjustment of the locating plate 370 (e.g., by adjusting threaded nuts 376), for example, to accommodate filter cartridges of varying lengths, or to compress the end plugs 372 against the filter cartridges 380 to provide a leak-tight seal.

When pressurized fluid is applied to the inlet port 320, the fluid passes through the porous sides of the filter elements provided with the filter cartridges 380 (thereby filtering impurities from the fluid) and flows through the hollow central portions of the filter cartridges to pass through the end connections 362 and apertures 366 in the cartridge plate 360, allowing the filtered fluid to be discharged from the outlet port 330. For ease of purging the filtration vessel, pluggable drain ports 311, 312 may be provided in the shell 310, for draining unfiltered fluid and contaminates from the filtration chamber 313, and filtered fluid from the outlet chamber 318. Additionally, a pluggable vent port 345 may be provided in the upper end plate 340, for example, to relieve excess pressure, or to measure internal pressure (e.g., with a pressure gauge).

According to an inventive aspect of the present application, the fluid filtration device 300 may be adapted for ease of disassembly and maintenance. For example, as shown in the enlarged views of FIGS. 3C and 3D, the end plates 340, 350 may be provided with tapered external surfaces 341, 351 that seat against corresponding tapered internal surfaces 314, 315 of the shell 310. Abutment of the tapered surfaces prevents inward longitudinal movement of the end plates 340, 350. O-ring seals 343, 353 may be provided adjacent to or between the tapered surfaces 341, 351, 314, 315 to provide a leak-tight seal between the end plates 340, 350 and the shell 310. Fasteners, such as retaining rings or locking rings 342, 352 may be secured to the shell 310 adjacent to and longitudinally outward of the end plates 340, 350 (and may be assembled to the end plates 340, 350, for example, by bolts 344, 354) to prevent outward longitudinal movement of the end plates 340, 350. The end plates 340, 350 may be easily removed from the shell 310, for example, to access the filter cartridges 380, by removing the locking rings 342, 352.

The cartridge plate 360 may also be detachably secured to the shell 310, for example, to facilitate maintenance, or to retrofit the fluid filtration device 300 for use of a different number or different size of filter cartridges 380. While many different arrangements may be utilized to detachably secure the cartridge plate 360 to the shell 310, in the illustrated inventive embodiment, a laterally split, outwardly resilient retaining band 390 is snap fit into interlocking engagement with a corresponding inner circumferential groove 319 in the shell. The groove is positioned adjacent to the desired location of the cartridge plate 360, such that the installed retaining band 390 supports the cartridge plate 360 and prevents outward longitudinal movement of the cartridge plate. The depth of the groove 319 is dimensioned for sufficient retention of the retaining band 390, while permitting a sufficient thickness of the retaining band to protrude inward from the inner surface of the shell, to adequately support the cartridge plate 360 when the fluid filtration device is under pressure. In an exemplary embodiment, the groove 319 is provided with a depth of approximately 3/16 inch, and the retaining band has a thickness of approximately 3/8 inch. Similar to the end plates 340, 350, the cartridge plate 360 may be provided with a tapered external surface 361 that seats against a corresponding tapered internal surface 316 of the shell 310, and an o-ring seal 363 adjacent to or between the tapered surfaces 361, 316.

The retaining band 390, as shown in FIG. 4, may be formed by any suitable method, including, for example, winding a band of material on a cylindrical mandrel, such that first and second ends 391, 392 of the band 390 are spaced apart by a gap 393 sufficient to accommodate constriction of the band 390 when the retaining band is installed in the shell 310. To provide for outward biasing of the installed retaining band 390, the retaining band may be wound or otherwise formed to a diameter that is equal to or greater than the inner diameter of the shell, such that the retaining band is resiliently biased out toward into interlocking engagement with the groove.

To install the retaining band 390 in the shell groove 319, the first and second ends 391, 392 of the retaining band 390 may be provided with first and second apertures 394, 395 (e.g., holes, notches, or cutouts) adapted for engagement with a pair of pliers or other such grasping tool (not shown), for constricting the retaining band 390 during installation in the shell 310. Once the constricted retaining band 390 has been inserted into the shell 310 and aligned with the inner circumferential groove 319, the grasping tool may release the retaining band 390 into resilient interlocking engagement with the inner circumferential groove 319, thereby securing the installed cartridge plate 360 in the shell 310.

In one embodiment, one or more of the wetted components of the fluid filtration device 300 may be provided in plastic, for example, to enhance corrosion resistance. In one such example, all wetted components are provided in plastic materials. For example, in one exemplary embodiment, the shell 310, inlet and outlet ports 320, 330, locating plate 370, and locating rods 375 are provided in fiberglass reinforced plastic (FRP), the cartridge plate 360 and end plates 340, 350 are provided in polyvinyl chloride (PVC), the end connections 362 and end plugs 372 are provided in nitrile rubber, the drain port 311 and nuts are provided in acrylonitrile-butadiene-styrene (ABS), and the o-rings 343, 353, 363 are provided in ethylene propylene diene monomer (EPDM). Non-wetted components, such as, for example, the locking rings 342, 352 may, but need not, also be provided in plastic materials or other materials well suited to corrosive environments.

The inventive filtration vessels may be provided in a variety of sizes for in a wide range of applications, with a wide range of flow rates (e.g., 10-1500 gallons per minute, or more), and for use with a varying number of filter cartridges. The exemplary device of FIGS. 3A-3F is adapted for use with twelve filter cartridges 380. Other sizes of filtration housing may be provided, and may be configured for use with different numbers and types of filter elements.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A fluid filtration device comprising:
    a tubular external shell defining a longitudinal axis;
    a first end plate secured to a first end of the shell;
    a second end plate secured to a second end of the shell;
    a cartridge plate secured to the shell between the first and second end plates, such that the first end plate and the cartridge plate define a filtration chamber, and the second end plate and the cartridge plate define an outlet chamber, the cartridge plate including a plurality of apertures configured to receive a plurality of filter elements assembled thereto;
    an inlet port joined with the shell to intersect the filtration chamber; and
    an outlet port joined with the shell to intersect the outlet chamber;
    wherein the cartridge plate is secured to the shell by a laterally split, outwardly resilient retaining band received in interlocking engagement with a corresponding inner circumferential groove in the shell, the inner circumferential groove being positioned adjacent to the cartridge plate, such that the installed retaining band prevents longitudinal movement of the cartridge plate toward the second end plate.

2. The fluid filtration device of claim 1, wherein the shell and the inlet and outlet ports comprise plastic.

3. The fluid filtration device of claim 1, wherein the shell and the inlet and outlet ports comprise fiberglass reinforced plastic.

4. The fluid filtration device of claim 1, wherein the retaining band comprises plastic.

5. The fluid filtration device of claim 1, wherein the retaining band comprises fiberglass reinforced plastic.

6. The fluid filtration device of claim 1, wherein the retaining band includes first and second apertures in corresponding first and second adjacent ends, the first and second apertures being adapted for engagement with a pair of pliers for constricting the retaining band during installation in the shell.

7. The fluid filtration device of claim 1, wherein at least one of the first and second end plates includes a tapered outer surface adapted to match a tapered inner surface of a corresponding one of the first and second ends of the shell, the tapered surfaces preventing inward longitudinal movement of the at least one of the first and second end plates with respect to the shell.

8. The fluid filtration device of claim 1, further comprising a retaining ring assembled longitudinally outward of at least one of the first and second end plates, the retaining ring preventing outward longitudinal movement of the at least one of the first and second end plates with respect to the shell.

9. The fluid filtration device of claim 1, wherein the wetted surfaces of the device are free of metal.

10. A method for assembling a fluid filtration device, the method comprising:
    providing a tubular external shell defining a longitudinal axis and having first and second ends and inlet and outlet orifices formed in an outer circumferential wall of the shell;
    securing an inlet port to the inlet orifice and an outlet port to the outlet orifice;
    installing a cartridge plate in the shell longitudinally between the inlet orifice and the outlet orifice, such that movement of the cartridge plate longitudinally toward the outlet orifice is prevented;
    assembling a plurality of filter elements to corresponding apertures in the cartridge plate;
    installing a first end plate on the first end of the shell, such that a tapered outer surface of the first end plate seats against a tapered inner surface of the first end, thereby preventing inward longitudinal movement of the first end plate;
    assembling a first fastener to the shell longitudinally outward of the first end plate to prevent outward longitudinal movement of the first end plate;

installing a second end plate on the second end of the shell, such that a tapered outer surface of the second end plate seats against a tapered inner surface of the second end, thereby preventing inward longitudinal movement of the first end plate; and assembling a second fastener to the shell longitudinally outward of the second end plate to prevent outward longitudinal movement of the second end plate;

wherein installing a cartridge plate in the shell longitudinally between the inlet oriface and the outlet oriface comprises interlocking a laterally split, outwardly resilient retaining band with a corresponding inner circumferential groove in the shell.

11. The method of claim 10, further comprising providing an o-ring seal between the shell and at least one of the first and second end plates.

12. The method of claim 10, wherein interlocking a laterally split, outwardly resilient retaining band with a corresponding inner circumferential groove in the shell comprises engaging first and second ends of the retaining band, constricting the retaining band, inserting the constricted retaining band into the shell, aligning the constricted retaining band with the inner circumferential groove, and releasing the retaining band into resilient interlocking engagement with the inner circumferential groove.

13. A fluid filtration device comprising:
a tubular external shell defining a longitudinal axis and having first and second ends and inlet and outlet orifices formed in an outer circumferential wall of the shell;
an inlet port bonded to the inlet orifice and an outlet port bonded to the outlet orifice;
a cartridge plate installed in the shell longitudinally between the inlet orifice and the outlet orifice, the cartridge plate including a plurality of apertures for receiving a plurality of filter elements assembled thereto;
a first end plate assembled with the first end of the shell, such that a tapered outer surface of the first end plate seats against a tapered inner surface of the first end, thereby preventing inward longitudinal movement of the first end plate;
a first fastener assembled to the shell longitudinally outward of the first end plate to prevent outward longitudinal movement of the first end plate;
a second end plate installed on the second end of the shell, such that a tapered outer surface of the second end plate seats against a tapered inner surface of the second end, thereby preventing inward longitudinal movement of the first end plate;
a second fastener assembled to the shell longitudinally outward of the second end plate to prevent outward longitudinal movement of the second end plate; and
a laterally split, outwardly resilient retaining band received in interlocking engagement with a corresponding inner circumferential groove in the shell, the inner circumferential groove being positioned adjacent to the cartridge plate, such that the installed retaining band prevents longitudinal movement of the cartridge plate toward the second end plate.

14. The fluid filtration device of claim 13, wherein at least one of the first and second fasteners comprises a retaining ring.

15. The fluid filtration device of claim 13, wherein the retaining band comprises fiberglass reinforced plastic.

16. The fluid filtration device of claim 13, further comprising an o-ring seal disposed between at least one of the first and second end plates and the shell.

17. The fluid filtration device of claim 13, wherein the shell and the inlet and outlet ports comprise fiberglass reinforced plastic.

18. The fluid filtration device of claim 13, wherein the wetted surfaces of the device are free of metal.

* * * * *

UNITED STATES PATENT AND TRADEMARK OFFICE
CERTIFICATE OF CORRECTION

PATENT NO. : 8,413,309 B2
APPLICATION NO. : 12/569207
DATED : April 9, 2013
INVENTOR(S) : Kevin Goodge and John Larmon Page 1 of 1

It is certified that error appears in the above-identified patent and that said Letters Patent is hereby corrected as shown below:

In the Claims:

Column 7, line 10, after "inlet" please delete "oriface" and insert -- orifice --.

Column 7, line 10, after "outlet" please delete "oriface" and insert -- orifice --.

Signed and Sealed this
Twenty-first Day of May, 2013

Teresa Stanek Rea
*Acting Director of the United States Patent and Trademark Office*